(12) United States Patent
Penninckx et al.

(10) Patent No.: US 6,631,221 B2
(45) Date of Patent: Oct. 7, 2003

(54) COMPENSATION OF POLARIZATION MODE DISPERSION

(75) Inventors: Denis Penninckx, Nozay (FR); Stéphanie Lanne, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/897,481

(22) Filed: Jul. 3, 2001

(65) Prior Publication Data

US 2002/0003916 A1 Jan. 10, 2002

(30) Foreign Application Priority Data

Jul. 6, 2000 (EP) .................................. 00401942

(51) Int. Cl.⁷ .............................................. G02B 6/00
(52) U.S. Cl. ..................... 385/11; 398/147; 398/152; 398/159
(58) Field of Search ..................... 385/11; 359/156, 359/187, 110, 161, 122; 398/158, 152, 213, 147, 159, 29, 81

(56) References Cited

U.S. PATENT DOCUMENTS

| 5,949,560 A | * | 9/1999 | Roberts et al. | 359/110 |
| 6,339,489 B1 | * | 1/2002 | Bruyere et al. | 327/538 |
| 6,385,357 B1 | * | 5/2002 | Jopson et al. | 359/156 |
| 2001/0028760 A1 | * | 10/2001 | Yaffe | 385/27 |
| 2002/0024704 A1 | * | 2/2002 | Erdogan et al. | 359/156 |
| 2002/0093643 A1 | * | 7/2002 | Moeller | 356/73.1 |

FOREIGN PATENT DOCUMENTS

| EP | 0 853 395 A1 | 7/1998 |
| EP | 0 909 045 A2 | 4/1999 |

OTHER PUBLICATIONS

M. Johnson et al, "Remote State-of-Polarization Control in Polarization-Maintaining Fiber" Optics Communications, Amsterdam, vol. 90, No. 1, Jun. 1, 1992, pp. 32–34 XP000274833.

* cited by examiner

*Primary Examiner*—Hemang Sanghavi
*Assistant Examiner*—Scott Knauss
(74) *Attorney, Agent, or Firm*—Sughrue Mion, PLLC

(57) ABSTRACT

A method and a device for compensating the polarization mode dispersion (PMD) of a transmitted optical signal comprise means of a polarization controller (3) coupled to a differential group delay (DGD) generator (5). The polarization controller (3) is controlled by a feedback loop, said feedback loop implementing an optimisation algorithm to optimize a feedback parameter of the output signal of the DGD generator (5). The algorithm takes into account the state of polarization (SOP) of an optical signal determined from the output signal of the polarization controller (3)) or from the output signal from the DGD generator (5).

9 Claims, 1 Drawing Sheet

COMPENSATION OF POLARIZATION MODE DISPERSION

BACKGROUND OF THE INVENTION

1. Field of the Invention

The invention relates to a method and a device for compensating the polarization mode dispersion (PMD) of a transmitted optical signal by means of a polarization controller coupled to a differential group delay generator, whereby the polarization controller is controlled by a feedback signal computed by a control algorithm.

2. State of the Art

A method and a device of this type are known in the art through EP-0 853 395.

All types of fiber links present the phenomenon of polarization mode dispersion, i.e. the impulse or signal emitted by an emitter terminal and transmitted via a fiber link is received in a deformed state by a receiver terminal. It shows a longer duration than its original duration. This deformation is due to the fact that the optical signal depolarizes during transmission. The signal received at the other end of the fiber link can be considered as two perpendicular components, where one corresponds to a state of polarization (SOP) with maximum propagation velocity and the other corresponds to an SOP with minimum propagation velocity. In other words, the signal received at the other end of the fiber link can be considered as being constituted by a first signal polarized with a privileged SOP arriving first and a second signal propagating with a second delayed SOP arriving with a delay called differential group delay, which depends in particular on the length of the fiber link.

If the emitter terminal emits an optical signal with a very short impulse, the optical signal received by the receiver terminal consists of two successive impulses polarized perpendicular to one another and having a time delay corresponding to the differential group delay. This delay can be in the order of 20 picoseconds for a link of 100 kilometers comprising a single mode fiber produced a few years ago. The deformation of the impulses received by the receiver terminal can cause errors in decoding the transmitted data, hence the polarization mode dispersion is a limiting factor for the performance of optical links, analog as well as digital.

Fibers with strong polarization mode dispersion, also called polarization maintaining fibers, are known, which allow supplying a fixed differential group delay by using short sections of fiber. Optical compensation of the polarization mode dispersion can be realized by disposing such a component, or a whole differential group delay generator, between two perpendicular polarization modes which result from a fiber link with strong polarization mode dispersion. This can be implemented either by using a polarization maintaining fibre (PMF) with the same differential group delay as the fiber link, but by exchanging the slow and fast principle SOPs, or by forcing a principle SOP of the system consisting of the fiber link and the PMF to coincide with the SOP of the source of emission. In order to do this, a polarization controller is placed between the fiber link and the PMF.

The value of the differential group delay and the principle SOPs of a link vary over time with temperature and vibrations. A compensation means must therefore be adaptive and the differential group delay of the PMF must be chosen such that it is at least equal to all the values of differential delay that are to be compensated.

Such a means for compensating the PMD in a system of optical transmission became known by the EP 0853 395 A1. The means comprises a polarization controller and a differential group delay generator. The controller and the generator are disposed between the fiber link and the receiver terminal. A feedback loop measures the degree of polarization (DOP) of the optical signal delivered by the DGD generator and feeds the polarization controller such that the DOP measured is optimized. However, using the DOP as feedback variable requires a complicated algorithm for computing the control of the polarization controller. Furthermore, the rewinding of birefringent elements in the polarization controller constitutes a major problem.

OBJECT OF THE INVENTION

SUMMARY OF THE INVENTION

The object of the present invention is therefore to provide a method and a device for a faster and more accurate control of the polarization controller.

TEACHING OF THE INVENTION

In a first aspect of the invention, the problem is solved by a method and a device for compensating the polarization mode dispersion (PMD) of a transmitted optical signal by means of a polarization controller coupled to a differential group delay (DGD) generator, whereby the polarization controller is controlled by a feedback loop, said feedback loop implementing an optimisation algorithm to optimize a feedback parameter of the output signal of the DGD generator. The algorithm takes into account the state of polarization (SOP) of an optical signal determined from the output signal of the polarization controller or from the output signal of the DGD generator. The feedback parameter can be the DOP, or a measure of the electrical spectral width, or a measure of the eye opening, etc. Preferably it is the DOP, as the measurement procedure is common. If the feedback parameter used is the DOP, it is more practical to measure it at the output of the DGD generator (since the same equipment is used), but the theory holds when it is measured at the input of it.

In a variant of the inventive method the SOP is computed from the Stokes parameters measured from the output signal of the DGD generator. For the feedback loop a very high speed is required. The Stokes parameters can be easily measured and from the measured values the position of the SOP on the Poincaré sphere can be easily computed. Hence the measurement of the Stokes parameters is particularly suitable for a fast and accurate feedback to the polarization controller. The control signals computed by the algorithm are fed back to the polarization controller. Measurement of the Stokes parameters allows to make the algorithm easier and faster. Thus the processing of high bit rates becomes possible in single mode fiber links.

In a preferred variant of the method the polarization controller comprises at least one birefringent element and for each birefringent element an angle α is fixed and a rotation angle β is variable, where the angle α is the angle between a rotation axis on the equatorial plane of the Poincaré sphere and the x-axis of a coordinate system and the rotation angle β defines the rotation around the rotation axis. A birefringent element changes the SOP at its input into another SOP at its output by a rotation of the SOP on the Poincaré sphere.

A polarization controller consists of a cascade of birefringent elements with either a variable α or a variable β, or both. If a birefringent element is to allow a variable β, the birefringent element must be wound back once the maximum β is reached since it cannot reach infinite values and other birefringent elements would have to compensate for this element. The rewinding process requires a complicated algorithm. In contrast, if the angle α is variable and β is fixed, the complicated rewinding process of the birefringent elements can be facilitated or even avoided.

Advantageously, the impact of each birefringent element on the position of the SOP on the Poincaré sphere is determined. If the position or the variation of the SOP on the Poincaré sphere is known, the algorithm in the feedback loop can take this into account and vary its step accordingly. The algorithm takes a larger step if the SOP is close to the rotation axis and a smaller step, when the SOP is further away from the rotation axis. In addition, knowing the variation of the SOP due to each birefringent element in the polarization controller allows to combine the birefringent elements such that the voltages applied to them and thus their position can be changed without changing the SOP. This increases the speed of the rewinding process. Determining the SOP and using it in the algorithm in the feedback loop could also be used with polarization controllers of the state of the art, i.e. where β is fixed and α is variable.

In a preferred embodiment of the inventive device, the polarization controller comprises at least one birefringent element. The control signals determined by the algorithm in the feedback loop are fed back to the polarization controller and the positions of the birefringent elements in the polarization controller are adjusted in order to compensate for PMD by maximizing the DOP. The constraints on the birefringent elements can be relaxed by use of the inventive device since the algorithm required to compensate for imperfections of the birefringent elements becomes less complicated.

Preferably, the DGD generator comprises at least one polarization maintaining fibre (PMF). The polarization maintaining fiber compensates for the differential group delay resulting from the fiber link by launching the fast signal part into the slow eigenstate of a polarization maintaining high birefringent fiber and vice versa.

BRIEF DESCRIPTION OF THE DRAWINGS

Additional advantages of the invention can be gathered from the description and the drawing. Also, the previously mentioned and the following characteristics can be used according to the invention each individually or collectively in any combination. The embodiments shown and described are not to be taken as a conclusive enumeration, but have exemplary character for the description of the invention. It shows.

DETAILED DESCRIPTION OF THE INVENTION

Figure 1:
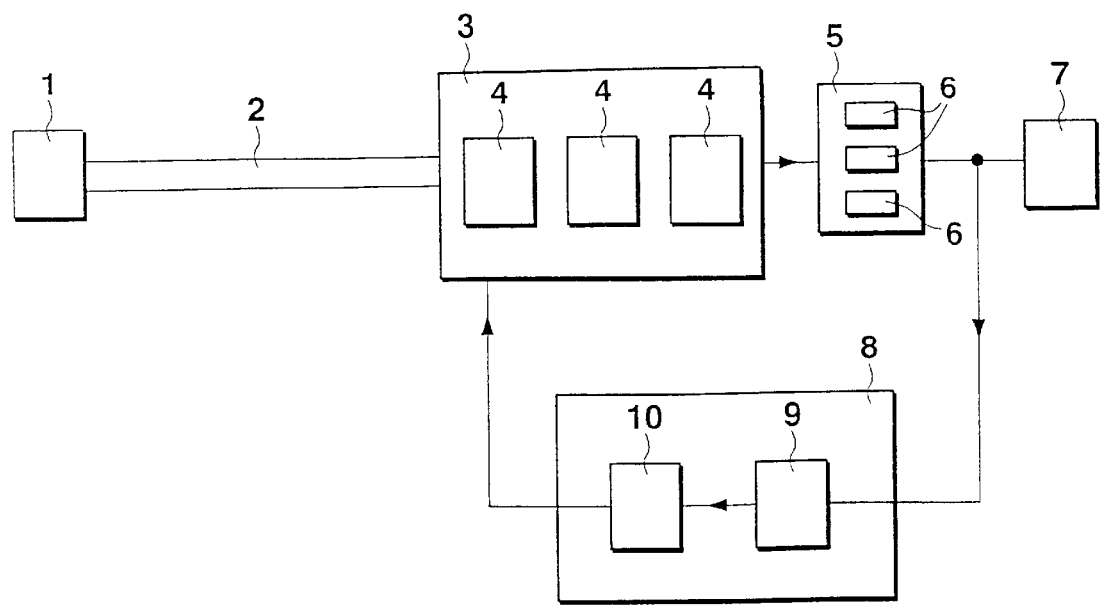
FIG. 1 a schematic representation of an optical communications system comprising an inventive device for the compensation of polarization mode dispersion.

In FIG. 1 the numeral 1 denotes an emitter terminal transmitting data as an optical signal, for example by modulating the intensity of one or several completely polarized optical carrier waves supplied by a laser. This optical signal is fed into a fiber link 2 connected to a polarization controller 3. The polarization controller 3 comprises several cascaded birefringent elements 4 for controlling the state of polarization (SOP). The polarization controller 3 is used for turning the angle of polarization of all the components of the optical signal received by the polarization controller 3. A differential group delay (DGD) generator 5 is disposed downstream from the polarization controller 3. The DGD generator 5 comprises polarization maintaining fibers 6 (PMF) of different lengths for compensating the differential delay resulting from the fiber link 2.

The optical output signal from the DGD generator 5 is transmitted to a receiver terminal 7 and a feedback loop 8. The feedback loop has a means 9 for measuring the Stokes parameters of the output signal of the DGD generator and a computing unit 10 calculating the control signal for the polarization controller 3 taking into account the Stokes parameters measured by the means 9.

Figure 2:
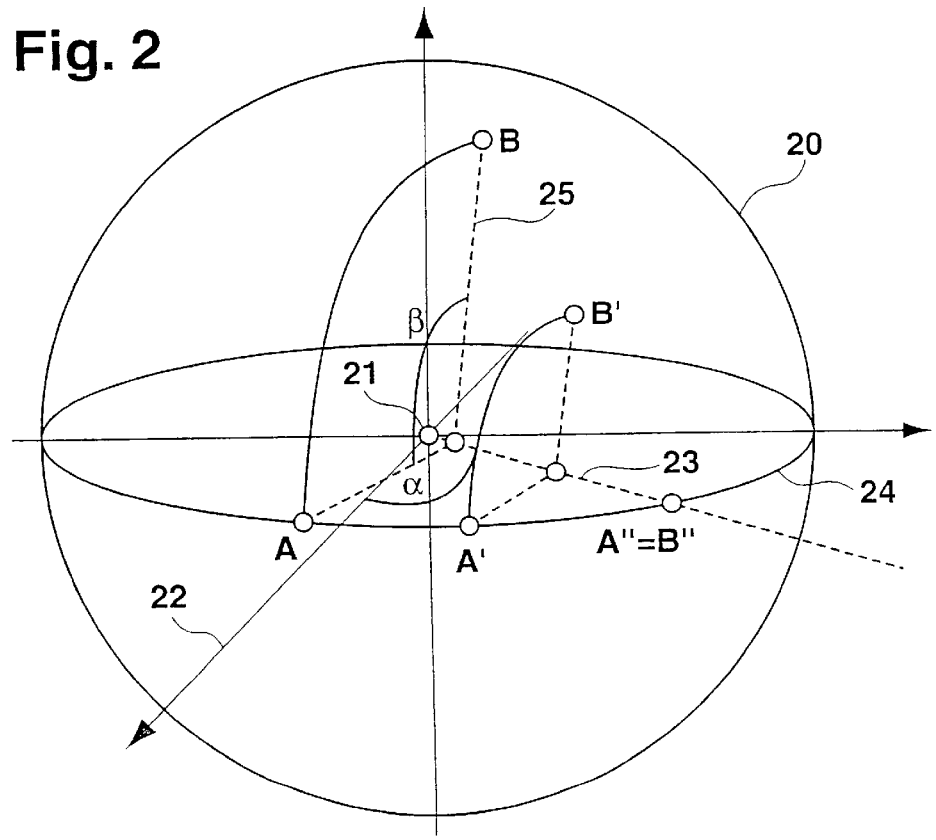
FIG. 2 a representation of the state of polarization in the Poincaré sphere.

FIG. 2 shows a representation of the state of polarization (SOP), for example A, in the Poincaré sphere 20. The Poincaré sphere 20 represents all the transitional states unpolarized light can assume with equal probability. In FIG. 2 a unit sphere (radius=1) is drawn with a system of coordinates, the origin 21 of which lies in the center of the Poincaré sphere 20. A birefringent element 4 changes the SOP A, A', A" at its input into another SOP at its output B, B', B" by a rotation of the SOP on the Poincaré sphere 20. The position on the Poincaré sphere 20 of an SOP B, B', B" of polarized light is defined by an angle α between the x-axis 22 of the system of coordinates and a rotation axis 23, and an angle β between the equatorial plane 24 of the Poincaré sphere 20 and a line 25 connecting the SOP B, B', B" at the input and the rotation axis 23, with the line 25 being perpendicular to the rotation axis 23.

In FIG. 2 the angle α is fixed and the angle β is variable. The SOPs A, A', A" at the input lie in this case all on the equator line of the Poincaré sphere. Each has a different distance to the rotation axis 23. When the birefringent element rotates the SOPs A, A', A" at the input by the angle β around the rotation axis 23, the SOPs B, B', B" result. If the distance of an SOP A, A', A" at the input to the rotation axis is large, the distance of the SOP B, B', B" at the output is also large. Thus, the algorithm in the feedback loop can adapt its step according to the distance of an input SOP A, A', A" from the rotation axis 23, i.e. a wider step when A, A', A" is close to the rotation axis and vice versa.

For a practical implementation of the algorithm and the measurement of the Stokes parameter the embodiment uses polarizers and photodiodes. An example of realization can be found in "Polarization measurement of signal and components", Agilent Technologies, Application Note 8509-1.

The rotation axis is determined locally by a small dithering of β. From the measured SOP, the rotation matrix can be obtained. The computation of the rotation axis will take into account the theory developed in "Polarization control for coherent communications", N. Walker et al., IEEE Journal of Lightwave Technology, vol.8, n3.

The algorithm operates as follows: Let us assume that the polarization controller in the PMD compensator is composed of four birefringent elements called cells. In a standard algorithm, the driving voltages of the cells are dithered one after the other. For each cell, the sequence is as follows:

the voltage is increased by a fixed amount ΔV
the feedback signal (DOP or other) is measured
if the feedback signal increases, the voltage is increased again by ΔV if not it is set back to the initial value
the same procedure is repeated with a decreased voltage Taking into account the invention, the algorithm can now dither the voltage with a variable step ΔV leading to a constant angular step on the Poincaré sphere. For each cell, the rotation axis is determined locally. The voltage to be applied on the cell therefore depends on the distance between the SOP and the rotation axis of the cell, and the target angular step. The main advantage is that the impact of each cell is quantitatively known: if the SOP is on the rotation axis of a cell, it is a waste of time to actuate this cell as it will have no effect on the polarization control.

In the case of a "rewinding", when the impact of each cell is formally known, it is possible to find the best combination of rotations that will bring us back to the initial SOP with reasonable voltages on the cells.

What is claimed is:

1. A method for compensating the polarization mode dispersion (PMD) of a transmitted optical signal, comprising the steps of:

providing a polarization controller coupled to a differential group delay (DGD) generator;

providing a feedback loop which controls the polarization controller, wherein the feedback loop implements an optimization algorithm to optimize a feedback parameter of an output signal of the DGD generator; and determining the state of polarization (SOP) of an optical signal present at an output of the polarization controller or at an output of the differential group delay generator;

wherein, in a Poincaré sphere representation of states of polarization, the polarization controller provides a rotation around an axis of a point representing a state of polarization of said signal, and the position of the point with respect to the axis is taken into account by the algorithm.

2. The method according to claim 1, characterized in that the feedback parameter is the degree of polarization (DOP).

3. The method according to claim 1, characterized in that the SOP is computed from Stokes parameters measured from the output signal of the DGD generator.

4. The method according to claim 1, characterized in that the polarization controller comprises at least one birefringent element and for each birefringent element an angle α is fixed and a rotation angle β is variable, where the angle α is the angle between a rotation axis on the equatorial plane of the Poincaré sphere and the x-axis of a coordinate system and the rotation angle β defines the rotation around the rotation axis.

5. The method according to claim 1, characterized in that the impact of each birefringent element on the position of the SOP on the Poincaré sphere is determined.

6. A device for compensating the polarization mode dispersion (PMD) of a transmitted optical signal comprising a polarization controller coupled to a differential group delay (DGD) generator whereby the polarization controller is controlled by a feedback loop, said feedback loop implementing an optimization algorithm to optimize a feedback parameter of the output signal of the DGD generator, characterized in that the feedback loop comprises means for measuring state of polarization (SOP) of optical signal present at output of the polarization controller or at output of the differential group delay generator, in that in a Poincaré sphere representation of states of polarization, said controlled polarization controller provides a rotation around an axis of a point representing a state of polarization of said signal, and the position of said point with respect to said axis is taken into account by said algorithm and a computing unit implementing the optimization algorithm, steps of the algorithm depending on the SOP.

7. The device according to claim 6, characterized in that the SOP is computed from Stokes parameters measured from the output signal of the DGD generator.

8. The device according to claim 6, characterized in that the polarization controller comprises at least one birefringent element.

9. The device according to claim 6, characterized in that the DGD generator comprises at least one polarization maintaining fibre (PMF).

* * * * *